(12) United States Patent
Penumatcha

(10) Patent No.: US 9,607,416 B2
(45) Date of Patent: Mar. 28, 2017

(54) DEVICE FOR DISPLAYING A TREND RELATED TO A PROCESS VARIABLE

(71) Applicant: YOKOGAWA ELECTRIC CORPORATION, Musashino-shi, Tokyo (JP)

(72) Inventor: Vijaya Rama Raju Penumatcha, Bangalore (IN)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 22 days.

(21) Appl. No.: 14/769,649

(22) PCT Filed: Apr. 4, 2014

(86) PCT No.: PCT/IB2014/060426
§ 371 (c)(1),
(2) Date: Aug. 21, 2015

(87) PCT Pub. No.: WO2014/203088
PCT Pub. Date: Dec. 24, 2014

(65) Prior Publication Data
US 2016/0005198 A1    Jan. 7, 2016

(30) Foreign Application Priority Data

Jun. 21, 2013 (IN) .......................... 2708/CHE/2013

(51) Int. Cl.
*G06T 11/20* (2006.01)
*G05B 23/02* (2006.01)
(Continued)

(52) U.S. Cl.
CPC ........ *G06T 11/206* (2013.01); *G05B 23/0232* (2013.01); *G05B 23/0272* (2013.01); *G06F 3/1454* (2013.01); *G06T 11/001* (2013.01)

(58) Field of Classification Search
None
See application file for complete search history.

(56) References Cited

U.S. PATENT DOCUMENTS 7,221,474 B2 * 5/2007 Hao ...................... G06T 11/206
                                                              358/1.18
8,570,326 B2 * 10/2013 Gorev .................. G06T 11/206
                                                              345/440
(Continued)

FOREIGN PATENT DOCUMENTS

JP   2002-340936 A   11/2002
JP   2005-227052 A    8/2005
(Continued)

OTHER PUBLICATIONS

International Search Report dated Aug. 19, 2014, issued in corresponding application No. PCT/IB2014/060426.
(Continued)

*Primary Examiner* — Edward Martello
(74) *Attorney, Agent, or Firm* — Westerman, Hattori, Daniels & Adrian, LLP

(57) ABSTRACT

Embodiments of the present disclosure relate to a device for displaying process trends related to a process variable of a process plant. The device has a display that has a number of pixels in the horizontal axis in a row in the vertical axis, a calculator that is used for dividing the plurality of data points by the number of pixels in the horizontal axis to get a first value. The display is further used for displaying the plurality of data points in a number of lines in a corresponding column of pixels, the number of lines is the half of the first value. This advantageously also allows the operator to comprehend the shape of the graph retaining the important information of the trend.

12 Claims, 8 Drawing Sheets

(51) Int. Cl.
G06F 3/14 (2006.01)
G06T 11/00 (2006.01)

(56) References Cited

U.S. PATENT DOCUMENTS

| | | | | |
|---|---|---|---|---|
| 8,972,295 B2* | 3/2015 | Johnson | ............... | G06Q 40/04 345/619 |
| 2009/0315889 A1* | 12/2009 | Tognola | ............. | G06K 9/00523 345/440 |
| 2010/0188410 A1* | 7/2010 | Gilbert | ............... | G05B 19/0426 345/473 |

FOREIGN PATENT DOCUMENTS

| | | |
|---|---|---|
| JP | 2007-94508 A | 4/2007 |
| JP | 2010-38886 A | 2/2010 |

OTHER PUBLICATIONS

Written Opinion(PCT/ISA/237) dated Aug. 19, 2014, issued in corresponding application No. PCT/IB2014/060426.

* cited by examiner

| Data Points |
|---|
| 25 |
| 65 |
| 45 |
| 55 |
| 45 |
| 35 |
| 65 |
| 75 |

DEVICE FOR DISPLAYING A TREND RELATED TO A PROCESS VARIABLE

TECHNICAL FIELD

The present disclosure is generally related to a device for displaying a plurality of data points on a trend, more particularly for a process variable that is at least one of pressure, temperature, acceleration, velocity, power, current and fluid flow.

BACKGROUND

Modern process control is becoming increasingly computerized, and part of this development is the addition of electronic intelligence to process components. Valves, sensors, controllers and similar devices are broadcasting information back to the electronic controllers which at times are inundated with information. Only portions of this information are relevant to plant operation. Other information are either noise, or redundant.

Trends are a common feature in many applications used in industrial automation domain. They are used by operator of the process control to analyze what has happened to process variable with respect to time. Many times the trend is seen as a performance bottleneck. The trend is supposed to load large amounts of data for analysis. When an operator is attempting to detect long or medium-term data trends, it is very common to compress the data on the graph by packing the data points very close together without combining data points.

Data compression analyzes the signal of the data stream to extract the critical aspects from the process data. Most of the time, the data compression techniques compress the data without requiring knowledge about how the data is rendered. An example of such a technique is 'sending one tuple for continuous range where the tag has maintained constant data'. However, this technique has serious limitations since most of the time the user is interested in data that has some dynamics associated with it. Also the technique does not take care of the tags with noise components.

Ideally this data compression should results in the more important points being kept. The data compression should benefit the operator by allowing a clearer display, uncluttered by noise. The process should aid interpretation by preserving significant aspects of the data, and showing clear trends.

Therefore, there exists a need for a device that resolves the above listed deficiencies. More particularly, the device needs to preserve the valuable aspects of the trend of a process control plant while reducing size of the trend.

SUMMARY OF THE DISCLOSURE

The shortcomings of the prior art are overcome and many additional advantages are provided through the present disclosure. Additional features and advantages are realized through the techniques of the present disclosure. Other embodiments and aspects of the disclosure are described in detail herein and are considered a part of the claimed disclosure.

According to the first aspect of the invention, there is provided a device for representing a plurality of data points on a graph. This device comprises a display which has a number of pixels in the horizontal axis in a row in the vertical axis and a calculator for dividing the plurality of data points by the number of pixels in the horizontal axis to get a first value. The display is used to represent the plurality of data points in a number of lines in a corresponding column of pixels, the number of lines is the half of the first value.

The fact that the device represents a plurality of data points of a graph on a column of pixels, based on the number of pixels in the horizontal axis in a row in the vertical axis, allows the operator to interpret the graph in a clearer manner, while preserving the significant aspects of the graphs.

Preferably, the calculator is used further to determine a maximum value and a minimum value of the plurality of data points represented within the corresponding column of pixels, when the number of lines is one.

In an embodiment, the present disclosure helps to highlight to the operator significant data points in each corresponding column of pixels.

Preferably, the calculator is used further to calculate a maximum value and a minimum value of the plurality of data points for each of the number of lines, when the number of lines is at least two.

It is possible that there are at least two lines representing the data points in each corresponding column on the display, and advantageously, this allows a clearer interpretation for the operator by identifying the corresponding maximum and minimum value for each of the corresponding line.

Preferably, when the number of lines is at least two, the calculator is used for calculating a value of crossover for each of the plurality data points, wherein the crossover is the number of times the value of one of the plurality of data points is repeated on the graph.

When there are at least two lines being represented in a column of pixels, the device of present disclosure identifies the data points that are more significant and should highlight to the operator by calculating the number of times the value of the data point is being repeated on the graph.

Preferably, when the number of lines is at least two, the calculator is used further for calculating a maximum value and a minimum value of crossovers among the values of crossovers for the plurality of data points. Preferably, the calculator further calculates a range of crossovers by dividing the difference between the maximum value and the minimum by the number of lines.

When there is at least two lines being represented in a column of pixels, the device of present disclosure calculates the density of the data points of the graph.

Preferably, when the number of lines is at least two, the plurality of data points to be represented by the lines is determined by the range of crossovers.

The device of the present disclosure advantageously identifies the data points to be represented on the display based on the range of crossovers.

In an embodiment, each of the number of lines is marked with a different colour. This allows a clearer and a more effective way for the operator to interpret the lines on the display.

In an embodiment, the device is configured to communicate with a server and at least one client. Preferably, the device is configured to receive information on the plurality of data points from at least one data sources, the information comprises at least one of the number of pixels in the horizontal axis in a row of the vertical axis on the display, a duration for the graph to be displayed, and a scale of the graph on the display. Preferably, the data sources are one of a system controller, a simulator, a database and a data source. Preferably, the data sources comprises a system controller, a simulator, a database and a data source.

This present disclosure advantageously works in a distributed network with a server and at least one client, and is used to interpret the data points of the graph based on the received information from a data source.

The aforementioned and other features and advantages of the disclosure will become further apparent from the following detailed description of the presently preferred embodiments, read in conjunction with the accompanying drawings. The detailed description and drawings are merely illustrative of the disclosure rather than limiting, the scope of the disclosure being defined by the appended claims and equivalents thereof.

BRIEF DESCRIPTION OF THE DRAWINGS

The features of the present disclosure are set forth with particularity in the appended claims. The embodiments of the disclosure itself, together with further features and attended advantages, will become apparent from consideration of the following detailed description, taken in conjunction with the accompanying drawings. One or more embodiments of the present disclosure are now described, by way of example only, with reference to the accompanied drawings wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Figure 1:
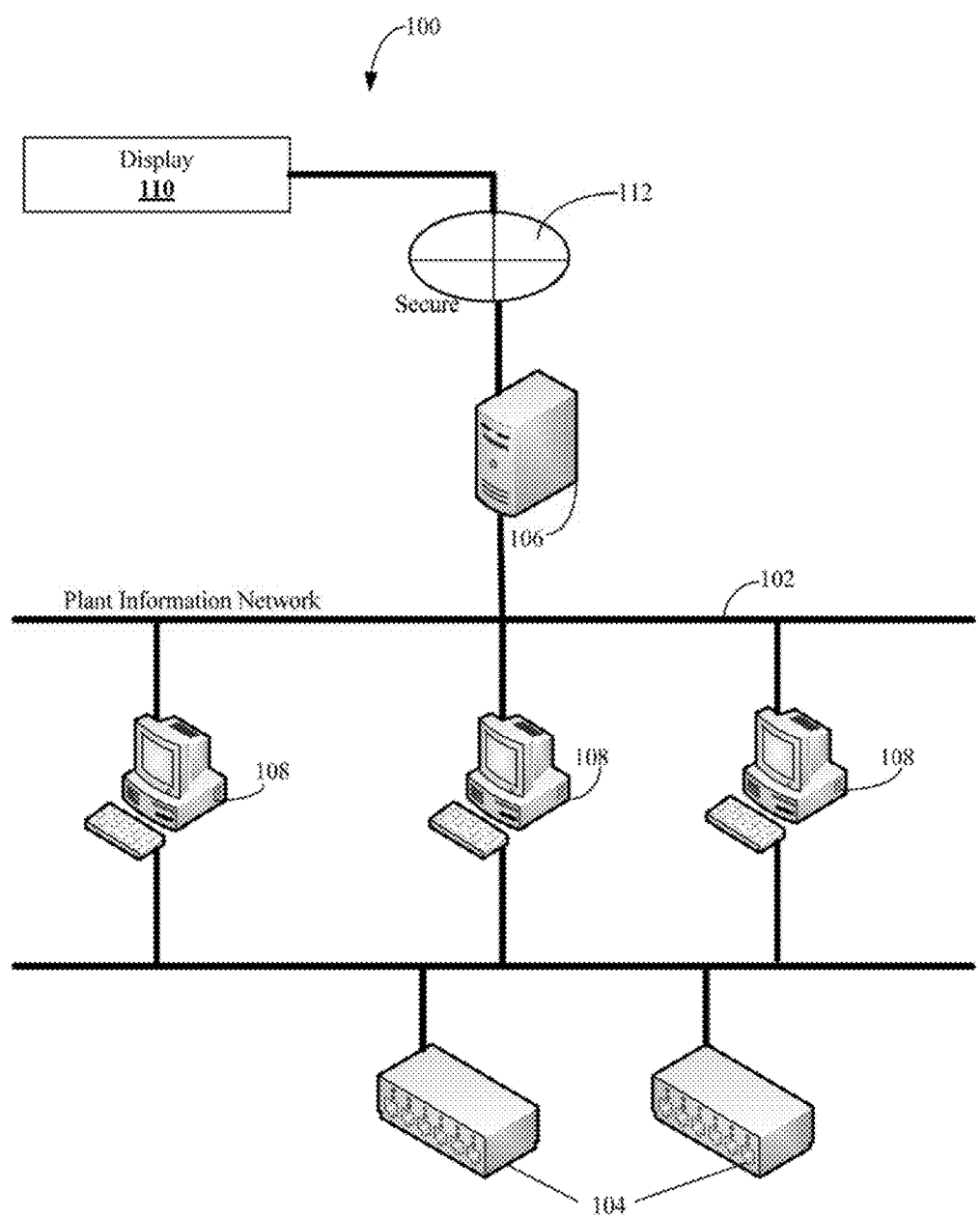
FIG. 1 shows distributed network with components of a system connected over plant information network according to an embodiment of the present disclosure.

FIG. 1 shows distributed network system 100 with components connected over plant information network 102 according to an embodiment of the present disclosure. The distributed network system 100 comprises one or more data sources 104, a server 106, one or more OPC servers 108 and a display 110 connected over the plant information network 102. The server 106 is connected to the display 110 through a secure network 112. The one or more OPC servers 108 collect information including but not limited to engineering, process, event, log files and configuration data from the one or more data sources 104 of a plant. The one or more OPC server 108 comprises an OPC UA interface, Historical Data Access module, an Alarms and Events module and data access module which helps in consolidating data from different data sources on a single platform as required by the operator. In a non-limiting aspect of the present disclosure, the OPC server 108 can be Object linking and embedding (OLE) for process control (OPC) server, Historian, and distributed control system or application log files etc.

Figure 2:
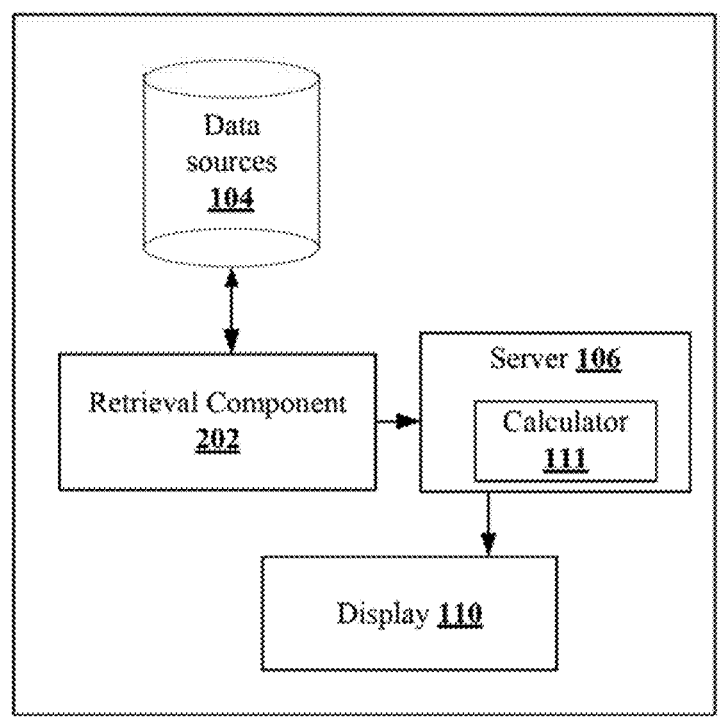
FIG. 2 illustrates an exemplary system to display a trend related to a process variable of a process plant according to an embodiment of the present disclosure.

FIG. 2 illustrates an exemplary system to monitor process trends of a process plant according to an embodiment of the present disclosure. The system comprises one or more data sources 104, the server 106, a retrieval component 202 and the display 110. The server 106 comprises a calculator 111. The one or more data sources 104 includes but is not limited to a system controller, a simulator, a database and any other combinations of the data source 104 which comprises at least one parameter of one or more real-time process variables. The real-time process variables include but not limited to a pressure, temperature, position, acceleration, velocity, power, current and fluid flow. The parameters of the real-time process variables include but not limited to a hysteresis, noise, oscillation and variability.

For the purposes of receiving the parameters of the real-time process variables, the server 106 establishes the communication with various data sources of the plant of an industry through the plant information network 102. The plant information network 102 is configured as Ethernet to acquire the parameters of the real-time process variable from the data sources 104. The plant information network 102 comprises a public network e.g., the Internet, World Wide Web, etc. or private network e.g., local area network (LAN), etc. or combinations thereof e.g., a virtual private network, LAN connected to the Internet, etc. Furthermore, the plant information network 102 need not be a wired network only, and may comprise wireless network elements as known in the art.

The retrieval component 202 obtains the parameters of the real-time process variables from the data sources 104.

The server 106 communicates with the display 110 via one or more intervening secure networks 112. The intervening network(s) 112 comprise a public network e.g., the Internet, World Wide Web, etc. or private network e.g., local area network (LAN), etc. or combinations thereof e.g., a virtual private network, LAN connected to the Internet, etc. Furthermore, the intervening network 112 need not be a wired network only, and may comprise wireless network elements as known in the art. In the illustrated embodiment, the display 110 include hand-held devices, multiprocessor systems, microprocessor-based or programmable consumer electronics, network Personal Communication Service (PCS), minicomputers, mainframe computers, and the like.

Figure 3:
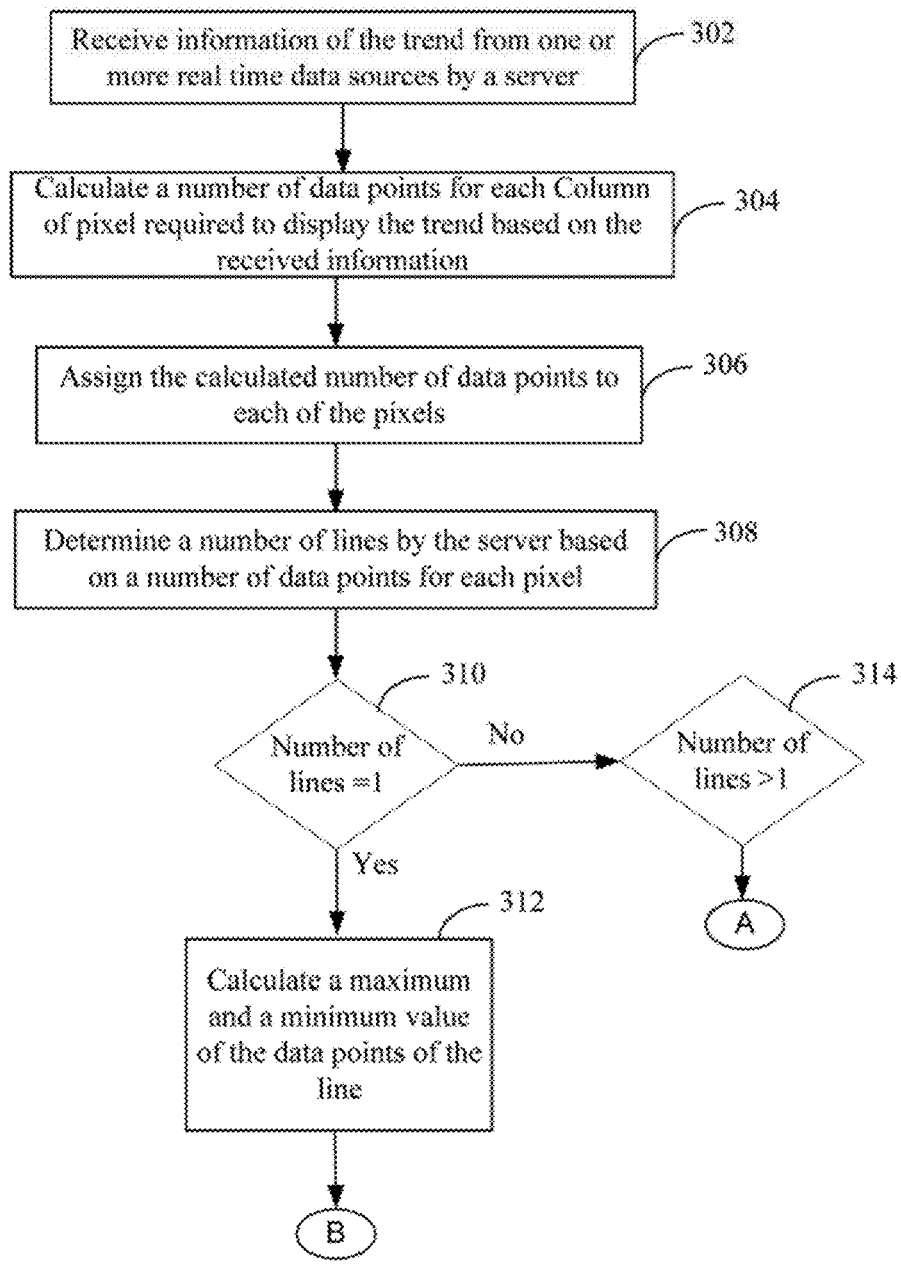
FIGS. 3 and 4 illustrate an exemplary method for displaying a trend related to a process variable of a process plant according to an embodiment of the present disclosure.
Figure 4:
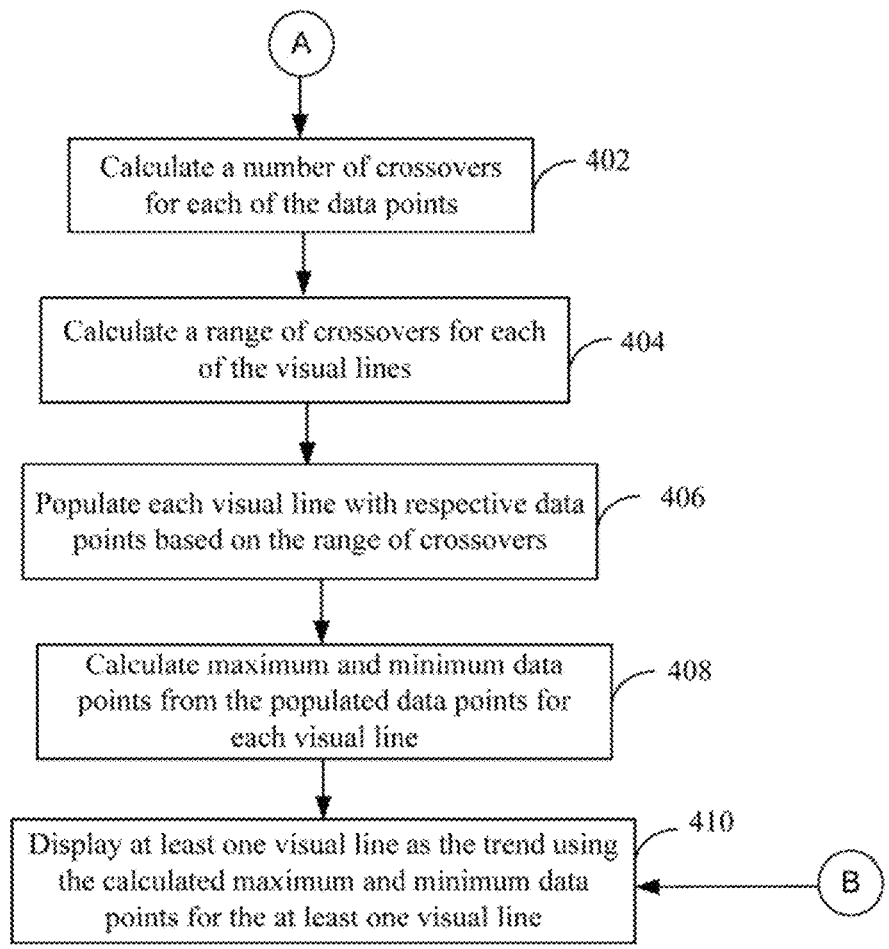

FIGS. 3 and 4 illustrate an exemplary method for displaying a trend related to a process variable of a process plant according to an embodiment of the present disclosure.

The method of present disclosure discloses a compression technique which takes into account the current constraints. For example, for displaying a trend on screen, the number of pixels within which the large amount of data has to be rendered is considered. This information is passed from the operator to the server informing the server that a data is required that represents a trend of X period with Y pixels.

Figure 5:
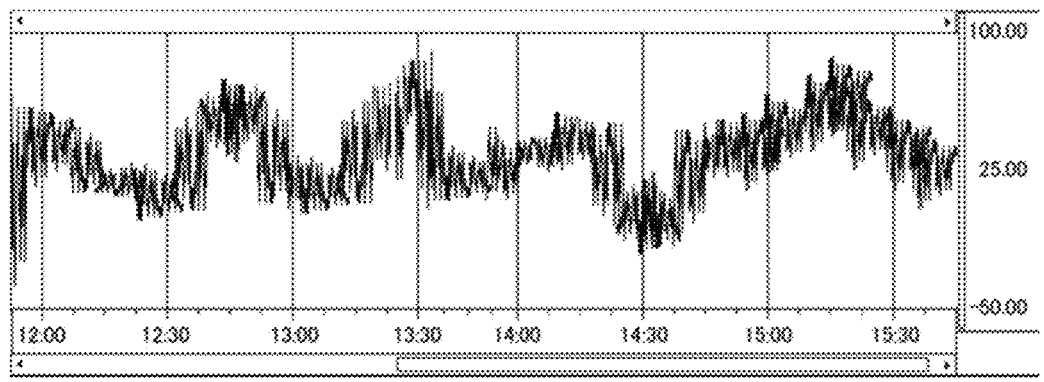
FIG. 5 illustrates a trend chart with large number of data in accordance with an embodiment of the present disclosure.
Figure 6:
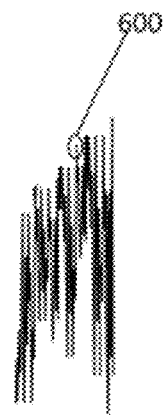
FIG. 6 illustrates a zoom-in view of the trend chart in accordance with an embodiment of the present disclosure.

The server can process this data with the following technique. Let us consider an exemplary embodiment where the trend occupies a space of 800 pixels on the screen and the operator wants to display a trend of 1 day data which has been acquired at 1 second. The available data would be 24*60*60=86400. FIG. 5 illustrates a trend displaying about 86400 data points in 800 pixel space with no data compression. FIG. 6 illustrates a zoom-in view of the trend chart. In the FIG. 6, each line of the trend marked by 600 corresponds to 108 data points. Transferring this much data onto the display is very problematic and if the data is re sampled randomly ignoring data at some instances the full dynamics of the data on the trend cannot be captured.

If a trend with 86400 data points is rendered with a length of 800 Pixels, then each column of pixels on the horizontal-axis displays 86400/800=108 data points, as calculated by the calculator 111. Now, the 108 data represented on the display displays a line from maximum value in those 108 data points to the minimum value in those 108 data points. Therefore, if only two data points, i.e. 800*2 data points (one for maximum and one for minimum) are transmitted, it would be sufficient for the user to comprehend the shape of the trend and this greatly enhances the performance of the trend component.

The method for displaying a trend related to a process variable of a process plant is explained in detail below. The information of the trend to be displayed on the display 110 is first sent to the server 106. The server 106 receives the information of the trend from the one or more data sources 104 at step 302. In an embodiment, the server 106 receives trend information from the one or more data sources 104 through the one or more OPC servers 108 on a plant information network 102. The trend information provided to the server 106 includes but is not limiting to number of pixels available on the display 110 for plotting the trend horizontally, scale of the trend along the vertical axis and the horizontal axis, start time and end time, i.e. duration for which trend should be displayed and number of pixels in the horizontal axis in a row of the vertical axis on the display 110. The number of data points is based on the trend and are represented in multiples of two.

Once the trend information is transmitted to the server 106, the server 106 modifies the trend information before sending the data back to the display 110 for displaying the data. First, a calculator 111 calculates a number of data points to be considered for each column of pixels at step 304. In an exemplary embodiment, an operator wants to display a trend of 1 day data which has been acquired at 1 second span. The available data points would be 24*60*60=86400. Further, the display 110 has 800 pixels in the horizontal axis in a row in the vertical axis for displaying the trend. Therefore, number of data points for each column of pixels is calculated by dividing the number of data points by number of pixels in the horizontal axis in a row in the vertical axis, i.e. 86400/800=108.

At step 306, the server 106 assigns the calculated number of data points to each of the pixels i.e. first 108 data points are assigned to the first column of pixels, next 108 data points are assigned to the second column of pixels and so on.

Then, based on the number of data points per pixel received from the one or more data sources 104, the calculator 111 calculates a number of lines at step 308. In an embodiment, the number of lines is calculated as number of data points divided by two. This calculation is done on the basis that a line comprises two points, namely a start point and an end point. In an embodiment, the provision has given to operator for selecting the number of data points required to plot the line. Thus, the operator can vary the number of data points required to plot the lines as per his requirement or it can be preconfigured in the process. An exemplary set of data points for plotting a line in accordance with an embodiment of the present disclosure is illustrated in FIG. 7.

Figures 7, 8:
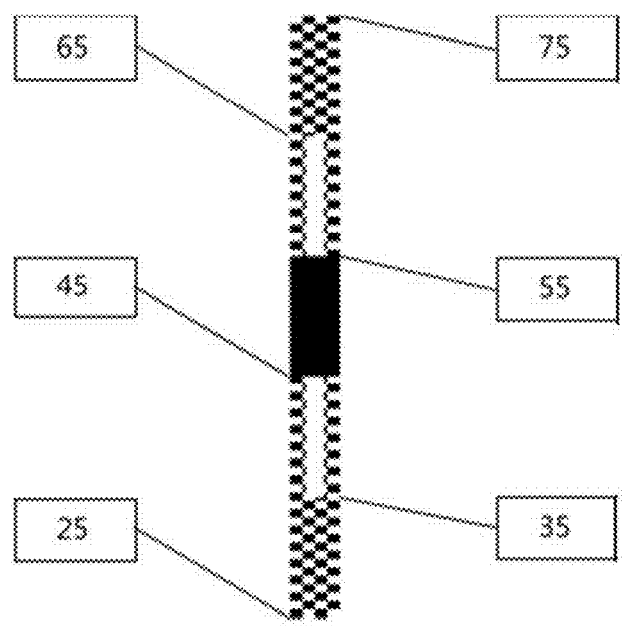
FIG. 7 illustrates a table containing set of data for a line in accordance with an embodiment of the present disclosure.
FIG. 8 illustrates a trend plot for a data set for a line in accordance with an embodiment of the present disclosure.

Using the set of data points for the number of lines, a trend plot with different concentration of transitions is illustrated in FIG. 8. To display a plurality of data points on the line, the concentration of transitions is calculated on each point and a different shade of the same trend colour is used. The operator can mention the data concentration per line to be displayed on the display 110. Based on the number of data points per line, the data per column of pixel increases or decreases. In an embodiment, anti-aliasing is used while plotting the trend. When the number of data points are more, a darker shade should be used for used for that portion of the line. This reduces the number of data points required for plotting the trend.

In an exemplary embodiment, 108 data points are used to represent a single line the number of colours that translates to would be a maximum of 108/2=54 shades. However, it may be challenging for an operator to clearly interpret the data points when 54 shades are used. Therefore, based on the context and the level of detail required for the trend, the number of shades can be controlled and each shade would translate to 2 points. In the above case, the number of data required to be transferred across the network would limit to around 6-10 data points per line as compared to 108 points. The 6-10 data points is arrived at by the level of detail required on the trend and the level of detail that can be comprehended by the user looking at the trend.

The number of data points selected in FIG. 8 is 6. Hence, the number of lines is 6/2=3.

Referring back to FIG. 3, at step 310, the server 106 determines whether the number of lines is equal to 1. If the line is equal to 1, then the server 106 calculates a maximum value of the data points and a minimum value of the data points at step 312. Then, the calculated maximum and minimum value of data points are transmitted to the display 110 by the server 106. At step 412, the line is displayed as a trend with the calculated maximum and minimum value of data points on the display 110.

In the alternative, if the number of lines is not equal to 1, then the server 106 checks whether the number of lines is greater than one at step 314. If the number of lines is greater than one, then the server 106 calculates a density of the data points on the vertical axis.

Figures 9, 10:
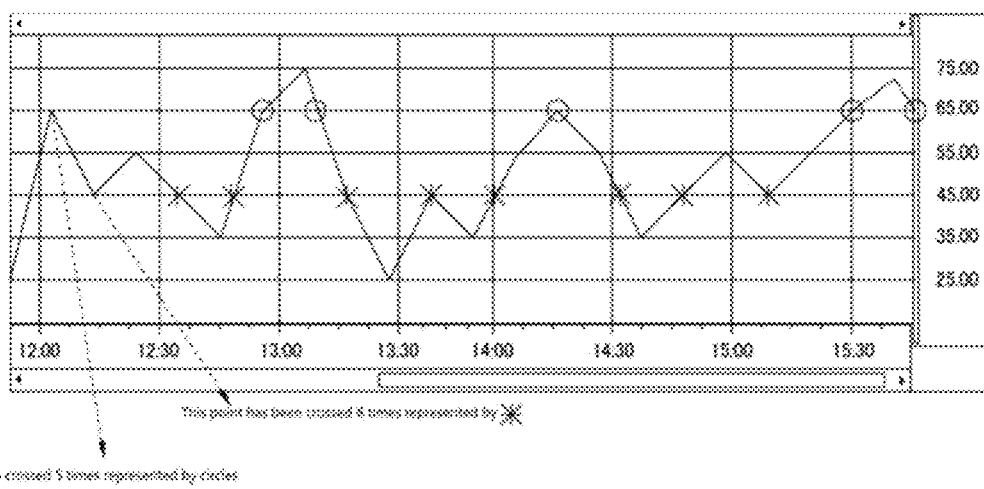
FIG. 9 illustrates a trend chart with crossovers of the data points in accordance with an embodiment of the present disclosure.
FIG. 10 illustrates a table showing crossover for the data points in accordance with an embodiment of the present disclosure.

At step 402, the server 106 calculates a number of crossovers for each data point. Calculating the crossovers for each data point is illustrated in FIG. 9. The number of crossovers is calculated by counting the number of times a data point is crossed when the trend moves forward, In the example illustrated in FIG. 9, the values of the data points are 25, 65, 45, 55, 45, 35, 65, 75, 45, 25, 45, 35, 55, 65, 55, 35, 45, 55, 45, 55, 65, 75, 65 and the line that joins the data points is the trend. In order to count the crossovers for data point having the value of 45, the number of times this value is repeated is calculated, including the first time it occurs. Hence, the number of crossovers for data point having value of 45 is 9.

An exemplary table with data points and crossovers for each of the data points is illustrated in FIG. 10.

Then, a range of crossovers is calculated for each of the lines at step 404. The range of crossovers for a line is calculated by dividing a difference between a maximum value of crossover and a minimum value of crossover by the total number of lines.

Referring to FIG. 10, the difference between the maximum value of crossover and the minimum value of crossover would be (9−2)=7. Let us assume the lines to be 2, for an example. Hence, Max−Min=9−2=7/2=3.5+2=5.5 of the range of crossovers, which is the mid-point. Here, a value of two is added because the range is divided into three segments. Referring back to FIG. 4, then at step 406, the server 106 populates each line with the respective data points based on the range of crossovers at step 406. As the range of crossovers is calculated as two, the number of lines would be two.

Figure 11:
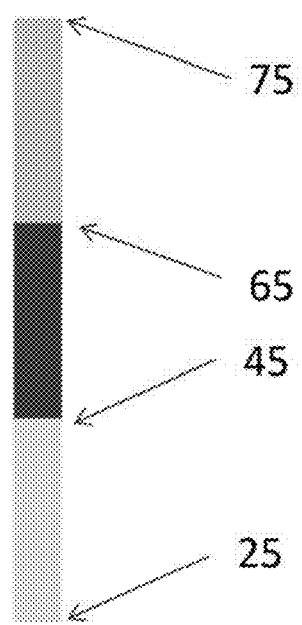
FIG. 11 illustrates an output line corresponding to the crossover range and the data points in accordance with an embodiment of the present disclosure.

The first line with crossover range greater than 5.5 is populated with data points 45, 55 and 65. The second line with crossover ranges less than 5.5 is populated with data points 25, 35 and 75. The output line corresponding to these points is illustrated in FIG. 11, where the dark line in the middle represents crossovers greater than 5.5 and the lighter lines above and below the dark line refers to crossover less than 5.5

Then at step 408, a maximum value of data points and a minimum value of data points are calculated for each of the lines. The calculated maximum and minimum value of data points is transmitted to the display 110 by the server 106 for plotting the trend. The display 110 receives the calculated maximum and minimum value of data points for each of the line and displays the plurality of lines one over the other at step 410.

In an embodiment, the device of the present disclosure improves performance of the trend. The developers and/or operators of an application based on the context of use of trend can tune the performance and the detail at which data can be stored.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Description | Reference Number |
| --- | --- |
| Distributed Network System | 100 |
| Plant Information Network | 102 |
| Data sources | 104 |
| Server | 106 |
| OPC servers | 108 |
| Display | 110 |
| Calculator | 111 |
| Secure Network | 112 |
| Retrieval component | 202 |

I claim:

1. A device for displaying a plurality of data points on a trend related to a process variable, comprising:
a display comprising a number of pixels in a horizontal axis in a row and in a vertical axis;
a calculator for dividing the plurality of data points by the number of pixels in the horizontal axis to get a first value;
wherein the display for displaying the plurality of data points in a number of lines in a corresponding column of pixels, the number of lines is the half of the first value.

2. The device of claim 1, wherein the calculator is configured to determine a maximum value and a minimum value of the plurality of data points represented within the corresponding column of pixels, when the number of lines is one.

3. The device of claim 1, wherein the calculator is configured to determine a maximum value and a minimum value of the plurality of data points for each of the number of lines, when the number of lines is at least two.

4. The device of claim 3, wherein the calculator is configured to calculate a value of crossover for each of the plurality data points, wherein the crossover is the number of times the value of one of the plurality of data points is repeated on the trend.

5. The device of claim 4, wherein the calculator is further configured to calculate a maximum value and a minimum value of crossovers among the values of crossovers for the plurality of data points.

6. The device of claim 5, wherein the calculator is further configured to calculate a range of crossovers by dividing the difference between the maximum value and the minimum by the number of lines.

7. The device of claim 6, wherein the plurality of data points to be represented by the lines is determined by the range of crossovers.

8. The device of claim 1, wherein each of the number of lines is marked with a different colour.

9. The device of claim 1, wherein the device is configured to communicate with a server and at least one client.

10. The device of claim 1, wherein the device is configured of receive information on the plurality of data points from at least one data sources, the information comprises at least one of
  (i) the number of pixels in the horizontal axis in a row of the vertical axis on the display,
  (ii) a duration for the trend to be displayed, and
  (iii) a scale of the trend on the display.

11. The device of claim 10, wherein the data sources comprises a system controller, a simulator, a database and a data source.

12. The device of claim 1, wherein the process variable is at least one of pressure, temperature, acceleration, velocity, power, current and fluid flow.

\* \* \* \* \*